United States Patent
Panosian

(10) Patent No.: US 6,962,002 B2
(45) Date of Patent: Nov. 8, 2005

(54) MULTI-TAPE MEASURING TOOL

(75) Inventor: Michael Panosian, Glendale, CA (US)

(73) Assignee: Olympia Group, Inc., City of Industry, CA (US)

( * ) Notice: Subject to any disclaimer, the term of this patent is extended or adjusted under 35 U.S.C. 154(b) by 0 days.

(21) Appl. No.: 10/760,327

(22) Filed: Jan. 20, 2004

(65) Prior Publication Data

US 2005/0155245 A1 Jul. 21, 2005

(51) Int. Cl.[7] ............................................. G01B 3/10
(52) U.S. Cl. ................................. 33/760; 33/764
(58) Field of Search ..................... 33/760, 755, 759, 33/761, 764, 767, 768, 769, 770, 494

(56) References Cited

U.S. PATENT DOCUMENTS

| | | | | |
|---|---|---|---|---|
| 1,643,166 A | * | 9/1927 | Martin | 33/494 |
| 2,684,534 A | * | 7/1954 | Ljungberg | 33/766 |
| 4,164,816 A | * | 8/1979 | Bergkvist | 33/764 |
| 4,651,429 A | * | 3/1987 | Ljungberg et al. | 33/764 |
| 4,700,489 A | * | 10/1987 | Vasile | 33/760 |
| 4,977,684 A | * | 12/1990 | Mosman | 33/766 |
| 5,809,662 A | * | 9/1998 | Skinner | 33/768 |
| 6,223,446 B1 | * | 5/2001 | Potter | 33/764 |
| 6,237,243 B1 | * | 5/2001 | Cook | 33/770 |
| 6,497,050 B1 | * | 12/2002 | Ricalde | 33/770 |

* cited by examiner

*Primary Examiner*—Christopher W. Fulton
(74) *Attorney, Agent, or Firm*—Myron Greenspan, Esq.; Lackenbach Siegel LLP

(57) ABSTRACT

A multi-tape measuring tool has a recoil-type tape measure and a removable ruler-type measure stored in a single housing. Conventionally, a user, such as an architect or an engineer, would have to carry one retractable tape measure along with a separate smaller ruler-like measuring tool, the smaller tool being useful, for example, in more confined spaces. The measuring tool of the presenting invention provides both a retractable tape measure and a separate ruler-like measuring tool stored in a single, easily carried unit.

20 Claims, 6 Drawing Sheets

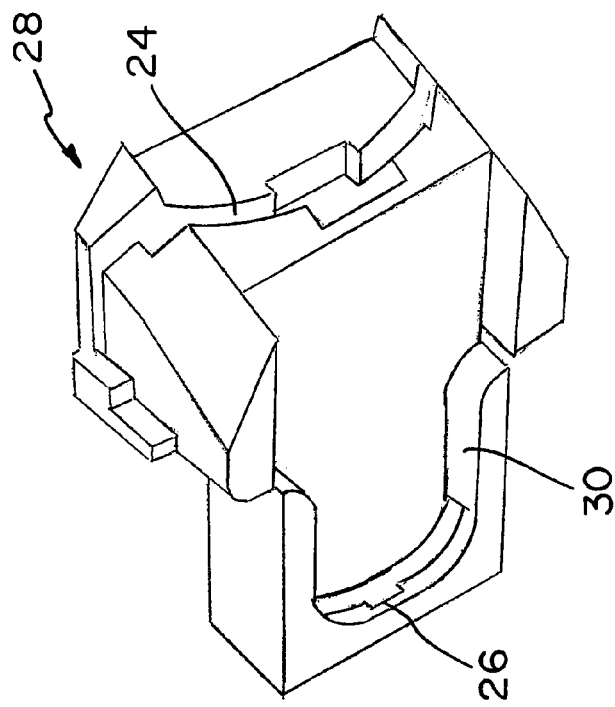
FIG. 5
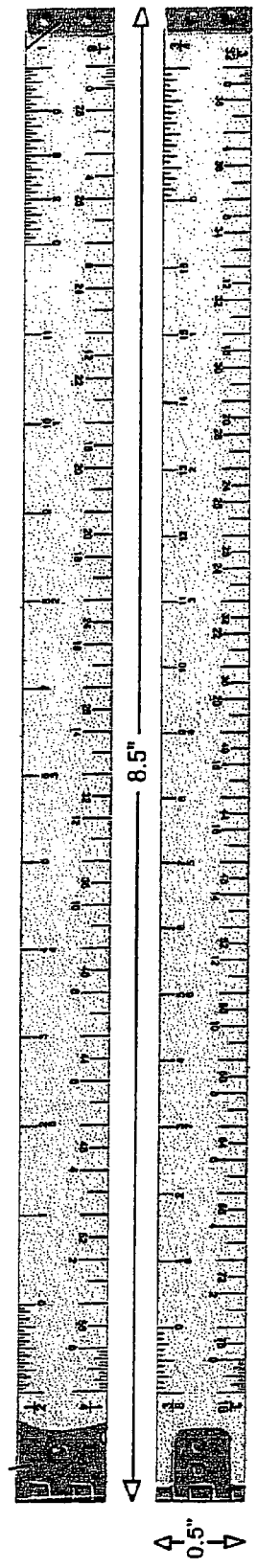
FIG. 3A
FIG. 3B

MULTI-TAPE MEASURING TOOL

BACKGROUND OF THE INVENTION

1. Field of the Invention

The present invention generally relates to a multi-tape measuring tool having a recoilable or retractable tape and at least one removable ruler-type tape stored in, and retractable from, a single housing. More specifically, the present invention relates to a multi-tape measure wherein at least one of the tapes is a tape removable from the measuring tool housing and imprinted with at least one architectural and/or engineering dimensional scale.

2. Description of the Prior Art

Conventional tape measures have been devised in a wide range of combinations. For example, U.S. Pat. No. 4,542,589 is directed to a tape measure and marker combination; U.S. Pat. No. 4,665,620 is directed to a tape measure and clip board combination; and U.S. Pat. No. 6,233,789 is directed to a tape measure and square tool combination. It is almost universal that the metal retractable tapes used in tape measures are marked with a 1:1 scale, so that the visual markings or indicia correspond to the actual dimension of the item being measured. Such markings or indicia can be in inches or centimeters, for example, or a combination of these, and can be divided to show eighths, sixteenths or thirty-seconds of an inch or hundreds and tenths of a centimeter. For this reason, most tape measures are not suitable for use with a civil or mechanical engineer's scale, or on an architect's scale. These scales are used, in contrast, to represent objects that are larger than those that can be drawn to their natural or complete size, and they are used to measure dimensions in a drawing or model in some proportional way. These scales are also used to determine the actual or full-size dimensions from drawings that have been so reduced in size.

Retractable metal tapes, which are permanently attached to the tape housing, are not suitable for use as scales for civil and mechanical engineers or architects. These metal tapes are basically two-dimensional and are typically printed only on one side of the tape—namely, the upper surface of the tape. This prevents but a limited amount of information to be printed, as only two sets of indicia are typically provided, one along each edge of the upper surface of the tape. However, the scales of civil engineer's scales typically show decimal parts with divisions of 10, 20, 30, 40, 60 and 80 to the inch, while the scales of mechanical engineers and architects typically use proportional feet and inches. The former is normally used for plotting, map-drawing and graphic solutions of problems, whereas the latter is used for machine and structural drawings.

Common scales include the following:

| | |
|---|---|
| *Full size | |
| *Scale 6" = 1' | half-sized |
| *Scale 4" = 1' | one-third sized |
| *Scale 3" = 1' | quarter sized |
| *Scale 2" = 1' | one-sixth sized |
| *Scale 1½" = 1' | one-eighth sized |
| *Scale 1" = 1' | one-twelfth sized |
| *Scale ¾" = 1' | one-sixteenth sized |
| *Scale ½" = 1' | one-twenty-fourth sized |
| *Scale ⅜" = 1' | one-thirty-second sized |
| *Scale ¼" = 1' | one-forty-eighth sized |
| *Scale 3/16" = 1' | one-sixty-fourth sized |
| *Scale ⅛" = 1' | one-ninety-sixth sized |
| *Scale 1/16" = 1' | one-one-hundred-twenty-eighth sized |

It is evident, therefore, that the extensive range of potential scales that are used by engineers and architects are too many to be shown or imprinted on a single surface of a retractable flat tape. For this reason, scales are frequently imprinted on an elongate rule having a triangular cross section, such configuration providing a total of six edges, and, therefore, six distinct scales can be imprinted or twelve scales if different scales are printed at opposing ends of the same edges. One disadvantage of this triangular form is that although it has more proportional scales on one rule than can generally be accommodated on flat rules such as retractable metal tapes, this is offset by the delay in finding the desired scale to be used and by the sheer bulkiness of the triangular configuration. Three flat scales are, therefore, equivalent to one triangular scale.

Many drafting professionals use a set of six or eight scales, each graduated in one division only. By having a complete set of scales, each to be read for only one frequently used proportional marking system, the engineer or architect can choose a simple rule in any given scale or in conjunction with any given drawing. As suggested, for plotting and map-drawing, the civil engineer scale may include decimals parts 10, 20, 30, 40, 50, 60, 80 and 100 to the inch. Such scales are typically not used for machine or structural work. This further multiplies the total number of scales that a professional might need in any given situation.

Traditional tape measures have not provided for these needs and, as noted, have on the whole only provided 1:1 scales on their flat surfaces. As most tape measures include only a single, two-dimensional or flat tape, the number of scales that can be imprinted thereon is necessarily extremely limited.

On the other hand, for some purposes a recoil-type or retractable tape measure, which may be bulky, may not work to advantage. For example, in a confined space such a tape measure may not be used because of its size. The user must then carry a separate, smaller ruler to make these measurements, although these small, lightweight rulers can easily be lost during a project.

Also known are measuring devices that include multiple tapes. See, for example, U.S. Pat. No. 6,223,446 which discloses a grade/level measuring device that includes a primary housing and a secondary casing, each of which contains like tape measuring blades. The device is intended to permit a user to make quick and accurate grade or height measurements with the two tape measure blades. However, both tapes appear to be similar in all respects, except that they are withdrawn from the tape measure along two different, generally orthogonal, directions. Neither tape is totally removable from the housing, and neither appears to bear engineering or architectural scales but only the conventional 1:1 scales.

Another patent, U.S. Pat. No. 5,815,940, discloses a take-out meter for attachment to conventional metal retractable tape permitting use of the tape measure with architectural/engineering drawing measurements, without the need for repetitive subtractions of fitting measurements. The objective of the design is to provide an attachment to a conventional and retractable measuring unit that permits a pipe fitter to make measurements quickly and easily. In U.S. Pat. No. 5,875,557, a scale is disclosed that is marked with centimeters and inches. The scale is 1:1. By lining certain scales on the tape, exact or actual or full linear measurements are permitted according to the metric system. At the same time, the approximate inch and foot linear determinations are permitted readily by sight. But since the scale is marked on a single side of a metal tape, only a limited number of scales can be accommodated. Frequently, however, engineers and architects use and require multiple scales when working with drawings drawn to different scales. The known tape measures do not provide them with the versatility or flexibility they derive from a sufficiently large set of scales that allows them to forego carrying a separate engineer's scale. It should also be noted that it is frequently inconvenient for a professional to use the retractable metallic tape, attached to the housing and having a cross-sectional curvature, in working with engineering drawings.

As can be seen, there is a need for an improved tape measure having not only the conventional recoilable or retractable tape, but also a smaller, removable ruler-type tape stored in a single, easily carried unit that provides the user with the flexibility of being able to use a wide range of scales he or she may require in addition to the conventional retractable tape.

SUMMARY OF THE INVENTION

In one aspect of the present invention, a tape measure comprises a first tape having a first measurement scale thereupon; at least one other, second tape having at least one other, second measurement scale thereupon; the first tape being stored in a cavity in the tape measure housing and being extendable from the cavity; and the second tape being stored in a guide within the tape measure housing and being removable therefrom. The second removable tape preferably has at least one engineer's or architect's dimensional scale and forms part of a kit composed of a plurality of such similar removable tapes each bearing different scales and each being selectively receivable within and removable from the housing.

In another aspect of the present invention, a tape measure comprises a first tape having a first measurement scale thereupon; at least one other, second tape having at least one other, second measurement scale thereupon; the first tape being stored in a cavity in the tape measure housing and being extendable from the cavity; the second tape being stored in a guide within the tape measure housing and removable therefrom; a shock absorber assembly (or tape interface unit) having a first opening where a first tape exits the tape measure and a second opening where the second tape exits the tape measure; at least one locking protrusion in the tape interface unit; at least one indentation on an end member of the second tape; and the at least one locking protrusion mating and securing the at least one indentation when the second tape is in a storage position in the guide in the tape measure, thereby preventing accidental removal of the second tape.

In yet another aspect of the present invention, a dual tape measuring tool comprises a first tape having a first measurement scale thereupon; at least one other, second tape having at least one other, second measurement scale thereupon; the first tape being stored in a cavity in the measuring tool housing and being extendable from the cavity; the second tape being stored in a guide within said measuring tool housing and removable therefrom, with the guide located along at least a partial periphery of the cavity; a tape retracting means for imparting a resilient force on the first tape tending to bring the first tape back into a stored position when extended from the cavity; a tape lock lever for locking the first tape into a desired extended position, thereby preventing the resilient force from bringing the first tape back into the storage position; a shock absorber assembly or tape interface unit having a first opening where the first tape exits the measuring tool and a second opening where the second tape exits the measuring tool; at least one locking protrusion in the tape interface unit; at least one indentation on an end member of the second tape; the at least one locking protrusion mating and securing the at least one indentation when the second tape is in a storage position in the guide in the measuring tool, thereby preventing accidental removal of the second tape; and a clip having an elastic member extending along a side of the measuring tool for securing the measuring tool to a surface.

The invention also contemplates a kit comprising a plurality of second tapes each with a different set of markings or indicia representing different proportional scales used by civil and mechanical engineers and architects. Each tape is selectively received within a guide provided within the measuring housing, is removable therefrom for use, can be re-positioned, and can be replaced with another tape forming the kit, within the guide following such use.

These and other features, aspects and advantages of the present invention will become better understood with reference to the following drawings, description and claims.

BRIEF DESCRIPTION OF THE DRAWINGS

FIGS. 3A and 3B are top plan view of opposing sides of one typical ruler-type tape removable from the tape measure housing and imprinted with dimensional scales, which can be typical of a plurality of such tapes that can form part of the prior art;

FIG. 5 is a perspective view of a shock absorber or tape interface unit used in the tape measure of the present invention.

DETAILED DESCRIPTION OF THE PREFERRED EMBODIMENTS

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a multi-tape measuring tool having a recoilable or retractable tape and at least one removable ruler-type tape stored in a single housing.

Conventionally, a user, such as an architect or an engineer, might have to carry one retractable tape measure along with a separate smaller engineer's or architect's scale. The measuring tool of the presenting invention provides both a retractable tape and a separate ruler-like tape in the form of an engineer's measuring scale stored in a single unit.

Figure 1:
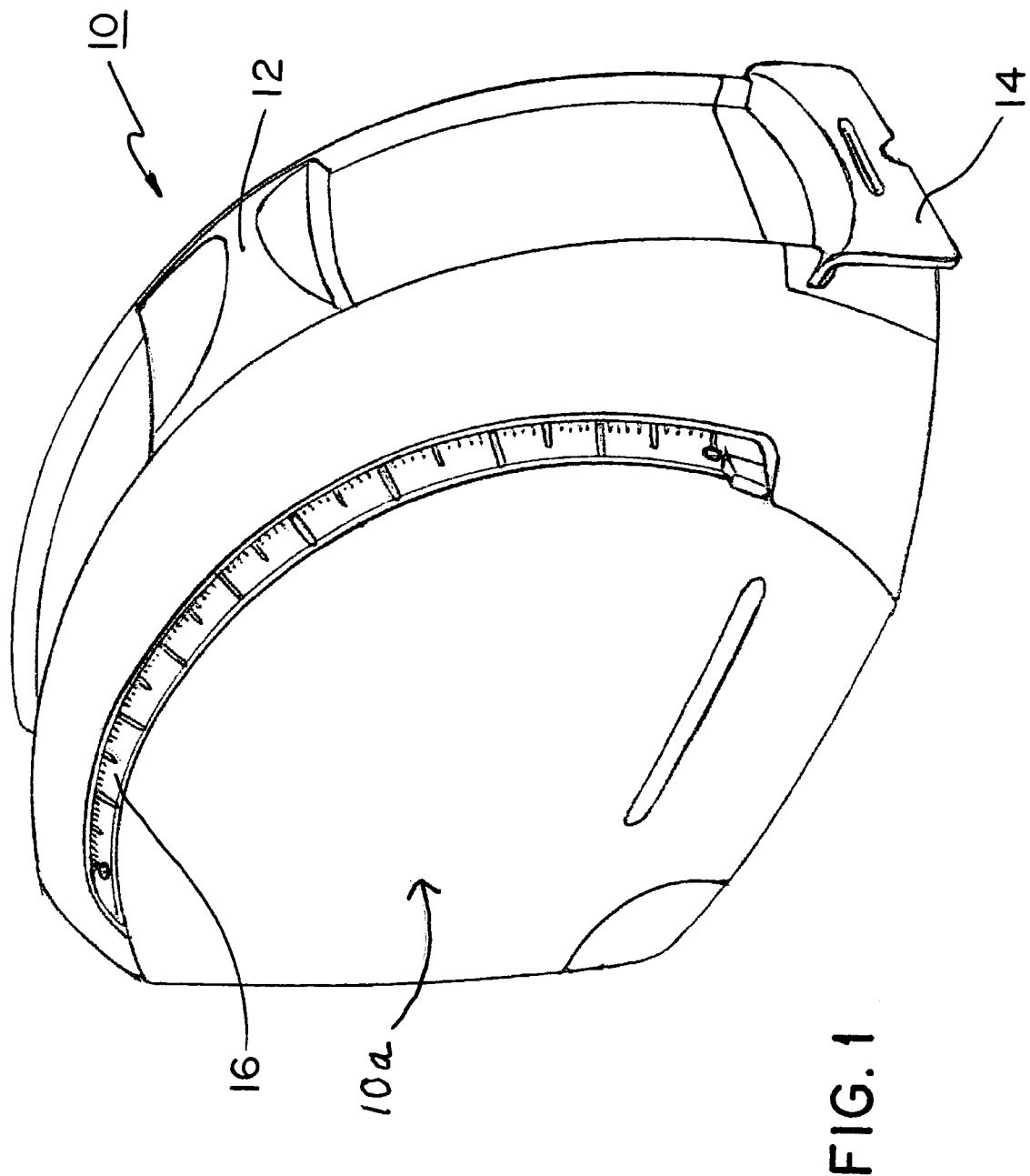
FIG. 1 is a front perspective view of the tape measure according to one embodiment of the present invention with all tapes fully retracted.

Referring to FIG. 1, a perspective view of a tape measure 10 according to the present invention is shown. The tape measure 10 includes a tape measure housing 10a, along with a tape lock lever 12 for preventing a conventional retractable tape (not shown) from retracting into tape measure housing 10. Tape stop 14 provides a means for gripping and pulling out the retractable tape as well as a stopping means for preventing the retractable tape from retracting entirely within the tape measure housing 10a. The tape measure 10 may also include a protractor 16 that is at least partially or removably received within a storage recess or compartment 10b, better shown in FIG. 3.

Figure 2:
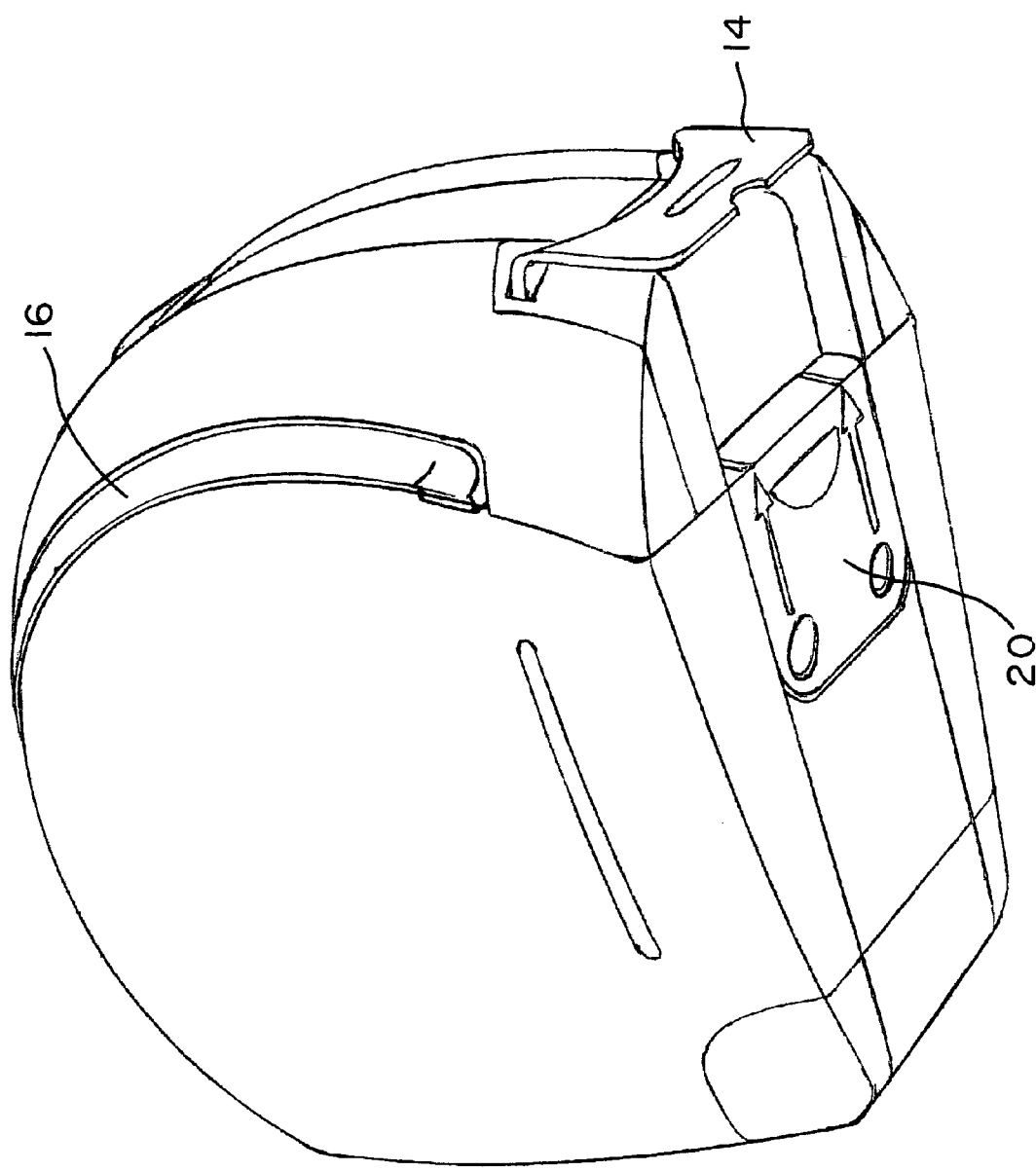
FIG. 2 is bottom perspective view of the tape measure of FIG. 1.

Referring to FIG. 2, a perspective view of the same tape measure housing 10 as shown in FIG. 1 is now shown from a bottom view. Tape measure 10 includes a removable tape (18 in FIG. 3), shown retracted within the housing 10a. Removable tape may be removed from tape measure housing 10a by pulling the removable tape tab or gripping member 20.

Figure 3:
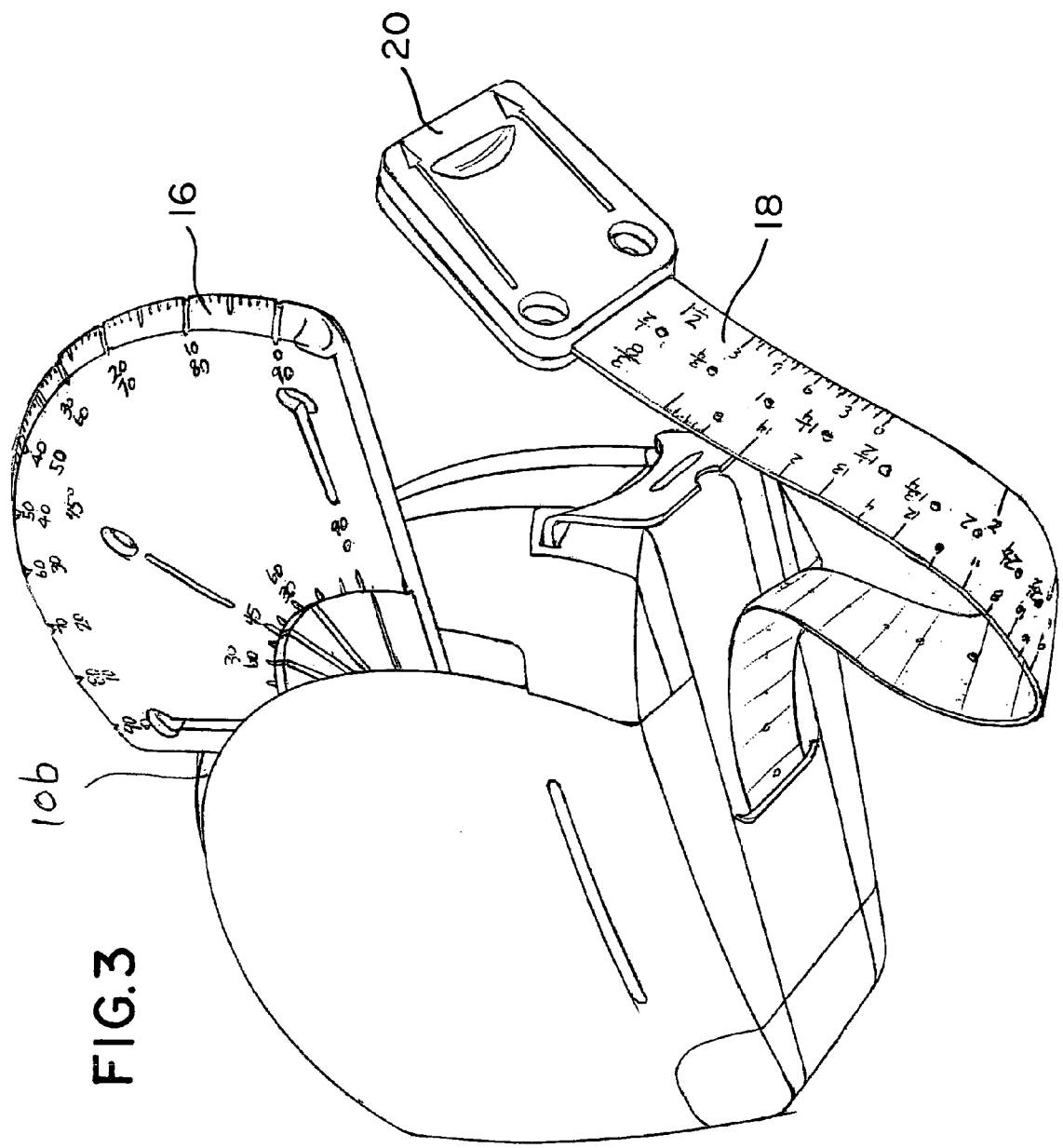
FIG. 3 is an alternate perspective view similar to FIG. 2 of the tape measure of FIG. 1 with the ruler-type tape with multiple engineer's scales and protractor extended.

Referring to FIG. 3, there is shown a perspective view of the tape measure of the present invention with both the protractor 16 and the removable tape 18 in extended positions. Protractor 16 may be used in its retracted position (as shown in FIG. 1), wherein the angular scale is relative to a bottom surface of the tape measure housing 10a. Additionally, the protractor 16 may be extended, as shown in FIG. 3, to measure angles in a variety of settings.

Removable tape 18 may be entirely removed from tape measure housing 10a by pulling removable tape tab or gripping member 20 away from tape measure housing 10a. Removable tape 18 may have various engineering scales thereupon, such as a ⅜ scale, a ½ scale and a 1½ scale, as shown in FIG. 3. Removable tape 18, however, is not limited to engineering scales, and may have any appropriate scale depending on the particular user's application, including scales in inches, centimeters, and the like, as described above. The invention also contemplates a kit comprising the tape measure housing 10a with its fixed, standard retractable tape, normally a multi-feet arcuate cross-sectional tape made of a coated metal blade, and a plurality of separate, shorter removable tapes 18, each imprinted with a separate scale from the set of all possible scales commonly used by engineers and architects, as aforementioned. FIGS. 3A and 3B illustrate, by way of example only, eight scales imprinted on two opposing sides of a single removable tape 18, including 1:1, 2:1, 4:1, 8:1, 8:3, 4:3, 16:3 and 32:3.

Figure 4:
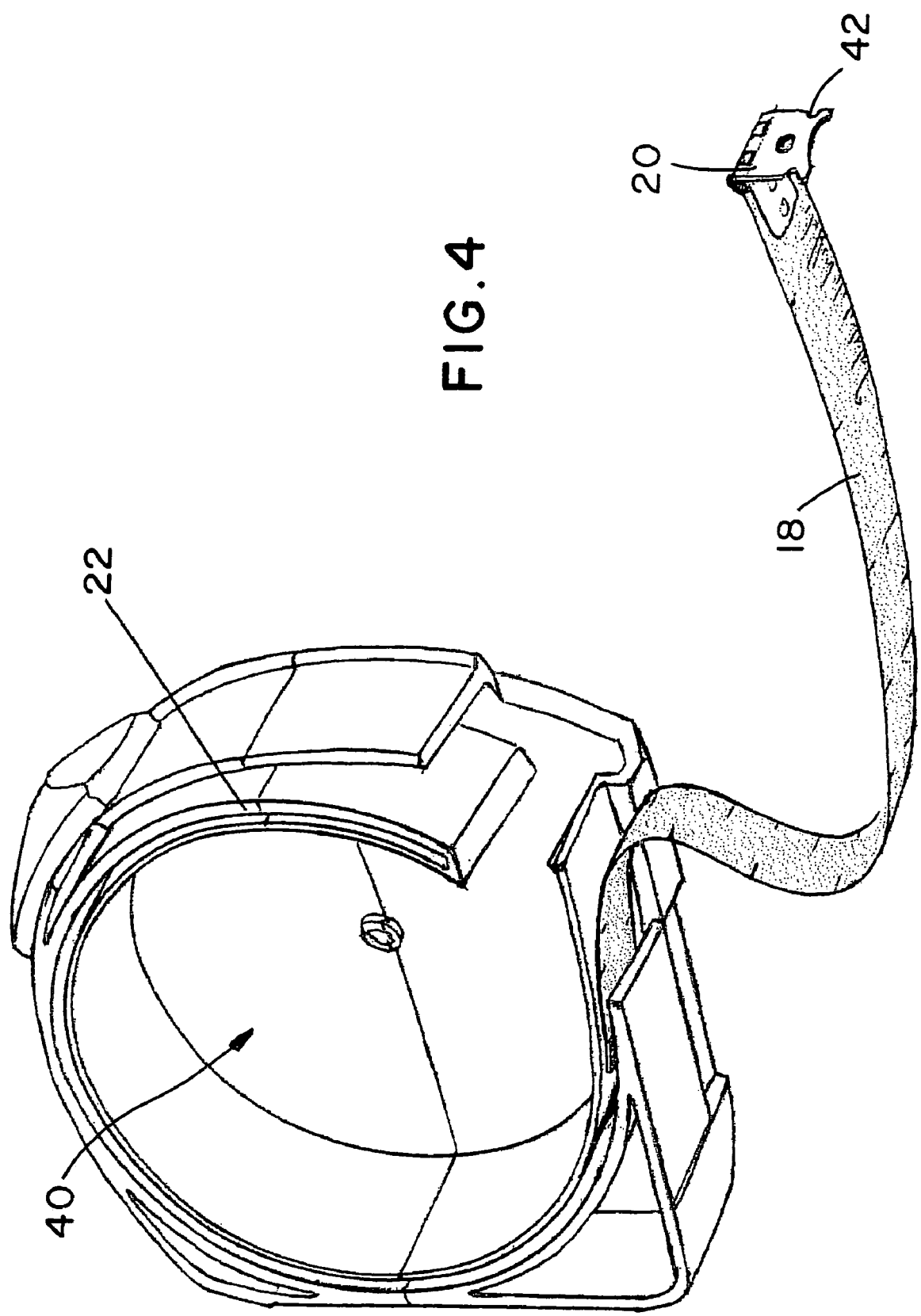
FIG. 4 is a view of the tape measure of FIG. 1, similar to FIG. 2, but with the cover and retractable tape withdrawn for the sake of clarity to show the details of the construction for receiving the ruler-type tape.

Referring now to FIG. 4, there is illustrated a cut-away view showing the inside of the housing 10a of the tape measure 10 of the present invention. A conventional retractable tape (not shown) is stored in a cavity 40 in the tape measure 10. Further included in cavity 40 is means for providing a retracting force on the retractable tape when it is pulled from a storage position to a use position. Such a retracting force may be provided by any means well-known in the art, such as conventional tape measure recoil mechanisms, in the form of a helical spring.

The housing 10a of the tape measure 10 also includes a removable tape guide 22 dimensioned to receive the tape 18 with some clearance so that the tape can be easily inserted and removed. The guide 22 forms a circumferential or peripheral channel about the greater part of a cavity 40, so that a tape 18 of suitable length can be accommodated. The removable tape 18 may be stored in, and withdrawn for use from, the guide 22. After use, removable tape 18 is slidably returned into the guide 22 through an opening 26 in the bottom surface of tape measure 10.

Referring to FIGS. 4 and 5, a detailed view of a shock absorber assembly or tape interface unit 28 is shown, according to an embodiment of the present invention. The shock absorber assembly or tape interface unit 28 has a retractable tape feed slot 24 into which the retractable tape is fed from the cavity 40 to the outside tape of the measure 10. A removable tape feed slot 26 communicates removable tape 18 from removable tape guide 22 to the outside tape measure 10. There may be disposed, adjacent to the removable tape feed slot 26, at least one removable tape-end locking protrusion 30. The locking protrusions 30 frictionally engage corresponding indentations 42 in the removable tape tab or gripping member 20 to retain the removable tape 18 within the removable tape guide 22 when in a stored position inside tape measure 10.

Figure 6:
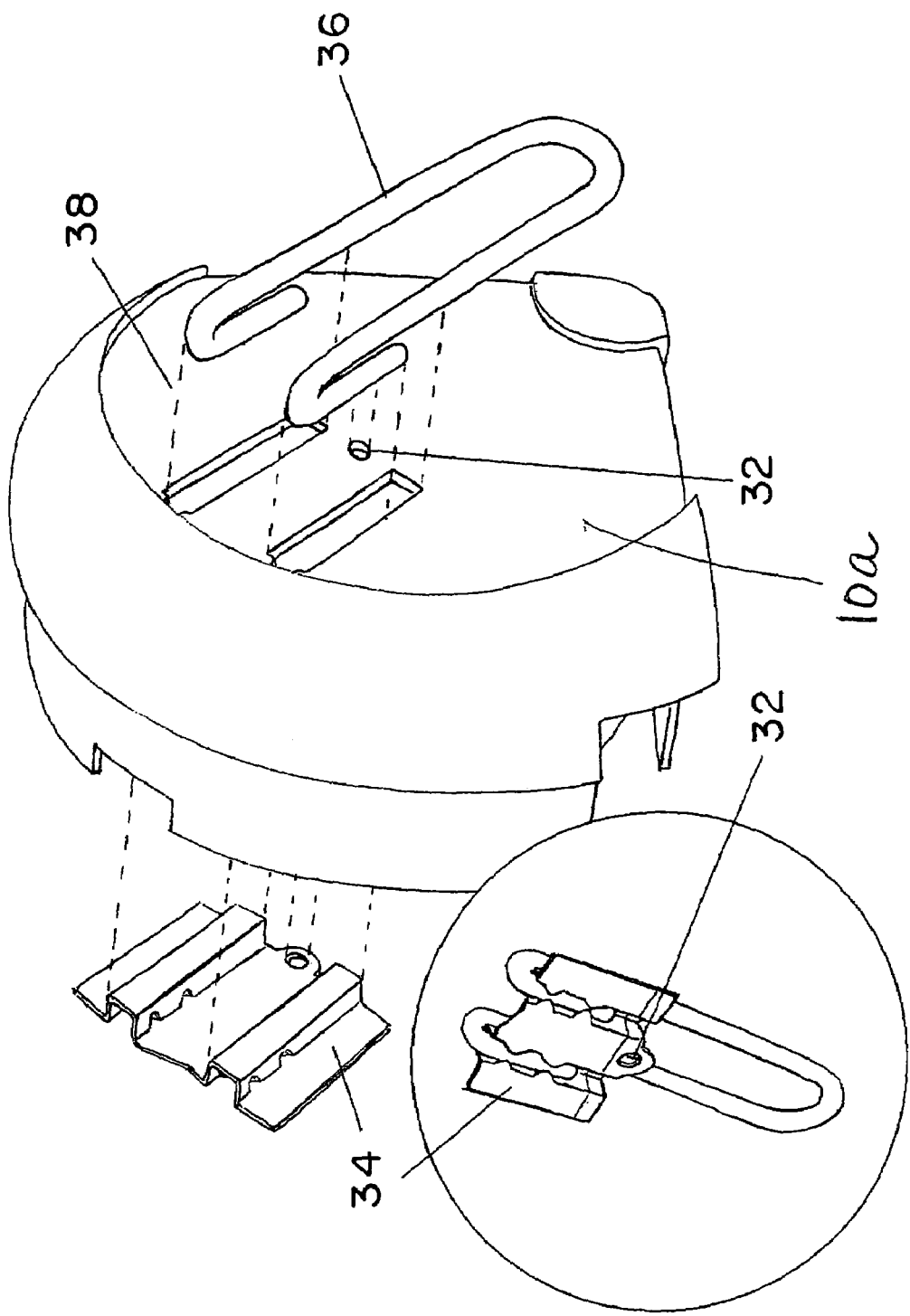
FIG. 6 is an exploded side view of a portion of the tape measure of the present invention, showing the clip attachment structure.

Referring now to FIG. 6, the attachment means for attaching a clip 36 to tape measure 10 is shown. Clip attachment holes 38 are formed on one side of the tape measure housing 10a. A clip backing plate 34 is positioned on the inside of tape measure housing 10a. Slots 44 in the clip backing plate align with clip attachment holes 38. The clip 36 is positioned in the slots 44 and a screw (not shown) secures the clip backing plate 34 to the tape measure 10 through the screw hole 32. When attached to the tape measure 10, the clip 36 may be resiliently moved away from tape measure housing 10a, thereby providing means for attaching tape measure to a supporting member such as a belt.

While the present invention has been described using a retractable metal-type tape in addition to the removable tape, the invention is not meant to be limited to such embodiments. For example, the tape measure may include a user-operated crank mechanism for retracting the retractable tape inside the tape measure. Such crank mechanisms are well-known in the art.

A flexible tape has been described as the removable tape in the above embodiment. The present invention is not meant to be limited to such a material selection, but, rather, any material capable of being stored in the removable tape guide 22 may be used. For example, a flexible metal or plastic material may be used to make the removable tape such that, when the tape is removed, it remains substantially rigid and ruler-like.

It should be understood, of course, that the foregoing relates to preferred embodiments of the invention and that modifications may be made without departing from the spirit and scope of the invention as set forth in the following claims.

I claim:

1. A tape measure comprising:
   a tape measure housing;
   a first tape having a first measurement scale thereupon;
   a second tape having a second measurement scale thereupon;
   said first tape being stored within a cavity in said tape measure housing and being extendable from said cavity; and
   said second tape being internally stored in a guide within said tape measure housing and being removable therefrom.

2. The tape measure of claim 1, wherein said second, removable tape is fully removable from said tape measure housing.

3. The tape measure of claim 2, further comprising a tape lock lever for locking said first tape into a desired extended position, thereby preventing said resilient force from bringing said first tape back into said storage position.

4. The tape measure of claim 1, wherein said second tape is marked with at least one engineering or architectural dimensional scale.

5. The tape measure of claim 1, further comprising a clip, said clip having an elastic member extending along a side of said tape measure housing for securing said tape measure housing to a surface.

6. The tape measure according to claim 1, wherein said first measurement scale is the same as said second measurement scale.

7. The tape measure according to claim 1, wherein said first measurement scale differs from said second measurement scale.

8. The tape measure according to claim 7, wherein at least one of said first measurement scale and said second measurement scale comprises at least one engineering or architectural scale.

9. The tape measure of claim 1, wherein said second tape is formed of a bendable material so that it can be received and stored within a non-linear tape guide within said tape measure housing.

10. A tape measure comprising:
   a first tape having a first measurement scale thereupon;
   a second tape having a second measurement scale thereupon;
   said first tape being stored in a cavity in said tape measure and being extendable from said cavity;
   said second tape being stored in a guide within said tape measure and being removable therefrom;
   a shock absorber assembly having a first opening where said first tape exits said tape measure and a second opening where said second tape exits said tape measure;
   at least one locking protrusion in said shock absorber assembly;
   at least one indentation on an end member of said second tape; and
   said at least one locking protrusion mating a securing said at least one indentation when said second tape is in a storage position in said guide in said tape measure, thereby preventing accidental removal of said second tape.

11. The tape measure of claim 10, further comprising a tape lock lever for locking said first tape into a desired extended position, thereby preventing said resilient force from bringing said first tape back into said storage position.

12. The tape measure of claim 10, further comprising a protractor mounted on a side of said tape measure, said protractor having angles inscribed therein, said angles being relative to a bottom surface of said tape measure when said protractor is in a storage position.

13. The tape measure of claim 10, further comprising a clip, said clip having an elastic member extending along a side of said tape measure for securing said tape measure to a supporting object.

14. The tape measure according to claim 10, wherein said first measurement scale is the same as said second measurement scale.

15. The tape measure according to claim 10, wherein said first measurement scale differs from said second measurement scale.

16. The tape measure according to claim 15, wherein at least one of said first measurement scale and said second measurement scale has at least one engineering scale.

17. A dual tape measuring tool comprising:
   a first tape having a first measurement scale thereupon;
   a second tape having a second measurement scale thereupon;
   said first tape being stored in a cavity in said measuring tool and being removable therefrom;
   said guide being located along at least a partial circumference of said cavity;
   a tape retracting means for providing a resilient force on said first tape to bring said first tape back into a storage position when extended from said cavity;
   a tape lock lever for locking said first tape into a desired extended position, thereby preventing said resilient force from bringing said first tape back into said storage position;
   a shock absorber assembly having a first opening where said first tape exits said measuring tool and a second opening where said second tape exits said measuring tool;
   at least one locking protrusion in said shock absorber assembly;
   at least one indentation on an end member of said second tape;
   said at least one locking protrusion mating and securing said at least one indentation when said second tape is in a storage position in said guide in said measuring tool, thereby preventing accidental removal of said second tape; and
   a clip having an elastic member extending along a side of said measuring tool for securing said measuring tool to a surface.

18. The dual tape measuring tool according to claim 17, wherein at least one of said first measurement scale and said second measurement scale includes at least one engineering scale.

19. A tape measure comprising:
   a first tape having a first measurement scale thereupon;
   a second tape having a second measurement scale thereupon;
   said first tape being stored in a cavity in said tape measure and being extendable from said cavity;
   said second tape being stored in a guide within said tape measure and being removable therefrom; and
   further comprising a protractor movably mounted within a space or compartment on a side of said tape measure housing, said protractor bearing angle markers inscribed thereon, said angle markers being relative to a bottom surface of said tape measure when said protractor is in a storage position.

20. A tape measure comprising:
   a first tape having a first measurement scale thereupon;
   a second tape having a second measurement scale thereupon;

said first tape being stored in a cavity in said tape measure and being extendable from said cavity;

said second tape being stored in a guide within said tape measure and being removable therefrom;

a shock absorber assembly being located where said first tape and said second tape exit said tape measure;

at least one locking protrusion in said shock absorber assembly;

at least one indentation on an end member of said second tape; and said at least one locking protrusion mating with an interference fit and securing said at least one indentation when said second tape is in a storage position in said guide in said tape measure, thereby preventing accidental removal of said second tape.

* * * * *